United States Patent
Murota

(10) Patent No.: US 9,252,639 B2
(45) Date of Patent: Feb. 2, 2016

(54) METHOD OF MANUFACTURING INDEX DEVICE OF MACHINE TOOL

(71) Applicant: FANUC CORPORATION, Yamanashi (JP)

(72) Inventor: Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 245 days.

(21) Appl. No.: 13/947,657

(22) Filed: Jul. 22, 2013

(65) Prior Publication Data

US 2014/0028122 A1    Jan. 30, 2014

(30) Foreign Application Priority Data

Jul. 27, 2012   (JP) .................................. 2012-167423

(51) Int. Cl.
| | |
|---|---|
| *H02K 5/04* | (2006.01) |
| *H02K 15/14* | (2006.01) |
| *H02K 9/00* | (2006.01) |
| *H02K 9/19* | (2006.01) |
| *H02K 9/22* | (2006.01) |

(52) U.S. Cl.
CPC .. *H02K 5/04* (2013.01); *H02K 9/00* (2013.01); *H02K 9/19* (2013.01); *H02K 9/22* (2013.01); *H02K 15/14* (2013.01); *Y10T 29/49009* (2015.01)

(58) Field of Classification Search
CPC ........... H02K 15/14; H02K 5/04; H02K 9/00; H02K 9/19; H02K 9/22; Y10T 29/49009
USPC ............... 29/596–598, 732–736; 264/272.19; 409/216, 231
See application file for complete search history.

(56) References Cited

U.S. PATENT DOCUMENTS

| | | | | |
|---|---|---|---|---|
| 3,979,822 A | * | 9/1976 | Halm | 29/596 |
| 4,862,582 A | * | 9/1989 | Henck | 29/596 |
| 4,868,970 A | * | 9/1989 | Schultz et al. | 29/596 |
| 5,038,460 A | * | 8/1991 | Ide et al. | 29/596 |

(Continued)

FOREIGN PATENT DOCUMENTS

| | | |
|---|---|---|
| CN | 102545406 A | 7/2012 |
| DE | 4018089 A1 | 12/1991 |

(Continued)

OTHER PUBLICATIONS

Office Action mailed Jan. 7, 2014, corresponds to Japanese patent application No. 2012-167423.

(Continued)

*Primary Examiner* — Minh Trinh
(74) *Attorney, Agent, or Firm* — Hauptman Ham, LLP

(57) ABSTRACT

A method of manufacturing an index device of a machine tool includes providing a jig having an outer periphery of the same outer diameter as an outer diameter of a motor for driving the index device, inserting the jig into a casing configured to house the motor for driving the index device prior to setting the motor into the casing, filling a material with higher thermal conductivity than the air into gap space created between the casing and the outer periphery of the jig through an opening provided in the casing; removing the jig from the casing when the material filled in the gap space becomes solidified; and setting the motor into the casing with the jig removed therefrom.

3 Claims, 7 Drawing Sheets

(56) References Cited

U.S. PATENT DOCUMENTS

| | | | |
|---|---|---|---|
| 5,313,698 A | | 5/1994 | Schaeftlmeier et al. |
| 5,584,114 A | * | 12/1996 | McManus ................... 29/596 |
| 6,058,593 A | * | 5/2000 | Siess .......................... 29/596 |
| 7,937,819 B2 | * | 5/2011 | Hanna et al. ............... 29/458 |
| 2009/0152962 A1 | | 6/2009 | Gasser et al. |
| 2014/0028122 A1 | * | 1/2014 | Murota ....................... 310/52 |
| 2014/0319936 A1 | * | 10/2014 | Makino et al. .............. 310/43 |

FOREIGN PATENT DOCUMENTS

| | | |
|---|---|---|
| DE | 102006011739 A1 | 9/2007 |
| JP | 4289042 A | 10/1992 |
| JP | 2003165038 A | 6/2003 |
| JP | 2007236045 A | 9/2007 |
| JP | 2009248242 A | 10/2009 |
| JP | 2010590 A | 1/2010 |
| JP | 2010119157 A | 5/2010 |
| JP | 2010214492 A | 9/2010 |
| JP | 2011259611 A | 12/2011 |

OTHER PUBLICATIONS

Office Action mailed Apr. 30, 2015, corresponding to Chinese patent application No. 201310322687.6.

Office Action dated on Sep. 7, 2015, corresponding to German patent application No. 102013107939.3.

* cited by examiner

METHOD OF MANUFACTURING INDEX DEVICE OF MACHINE TOOL

RELATED APPLICATIONS

The present application is based on, and claims priority from, Japanese Application Number 2012-167423, filed Jul. 27, 2012, the disclosure of which is hereby incorporated by reference herein in its entirety.

BACKGROUND OF THE INVENTION

1. Field of the Invention

The present invention relates to an index device of a machine tool having a motor built therein and a method of manufacturing the same.

2. Description of the Related Art

Recent machine tools such as machining centers use rotating table type index devices including a so-called direct drive structure in which a drive motor is directly coupled to the rotating shaft (see, for example, Japanese Patent Application Laid-Open No. 2009-248242). A direct drive index device is described with reference to FIG. 1.

A rotating table 11 for placing a workpiece (not shown) thereon is attached to a shaft 10 of a motor M that is contained in a casing 13 for housing the motor of an index device. The motor M includes a stator 17 and a rotor 16. The stator 17 has a stator coil 18 wound around a case 14 of the motor at the inner peripheral side thereof. The rotor 16 is attached to the shaft 10 that is rotatably journaled at the inner side of the stator 17 by a bearing 20 attached to a bracket 12 and a bearing 20 attached to a bracket 19. The index device having the motor M built therein is fixed to the table of a machine tool.

As depicted in FIG. 1, a recess is provided on the inner peripheral surface of the casing 13 for housing the motor M of the index device, such that gap space 15 is created in conjunction with the outer peripheral surface of the case 14 of the motor M so as to facilitate fitting of the motor M. Air is filled in the gap space 15.

As described above, in an index device having a motor built therein for use in a machine tool, gap space, i.e., back clearance, exists between the outer periphery of the motor and the inner periphery of the motor housing casing for the sake of assembly. Since the gap space is filled with the air, the thermal conductivity is lower, which could cause heat generated during the operation of the motor to be retained within the motor, accelerating rise in temperature of the motor. The motor becomes susceptible to overheat due to acceleration of temperature rise of the motor, which may decrease the continuous rated power of the motor.

Generally, forced cooling of the motor is conducted by circulating coolant in the gap space between the outer periphery of the motor and the motor housing casing so as to suppress rise in temperature of the motor. However, this involves, for example, additional provision of piping and pumps for circulating the coolant, as well as a temperature conditioner for managing the temperature of the coolant, causing increase in complexity of the structure of the index device and thus the costs therefor.

SUMMARY OF THE INVENTION

The present invention was made for providing an index device of a machine tool and a method of manufacturing the index device that are capable of efficiently transferring heat to be generated from a motor in operation to a casing for housing the motor of the index device, hence to achieve suppression of temperature rise of the motor at lower cost.

An index device of a machine tool according to the present invention includes: a motor configured to drive the index device; and a casing housing the motor. A material with higher thermal conductivity than the air is filled in gap space provided between the outer periphery of the motor and the inner periphery of the casing.

The casing may have a sealing feature maintaining the enclosed state of the gap space.

The casing may have an opening for use in introduction and sealing of the filling material, the opening penetrating the casing from the exterior of the casing to the gap space.

A first mode of a method of manufacturing an index device of a machine tool according to the present invention includes: setting in a casing a motor configured to drive the index device; and filling through an opening provided in the casing a material with higher thermal conductivity than the air into gap space created between the outer periphery of the motor and the inner periphery of the casing.

A second mode of the method of manufacturing an index device of a machine tool according to the present invention includes: inserting a jig into a casing configured to house a motor for driving the index device prior to setting the motor into the casing, the jig having the outer periphery of the same outer diameter as the outer diameter of the motor; filling a material with higher thermal conductivity than the air into gap space created between the casing and the outer periphery of the jig through an opening provided in the casing; removing the jig from the casing when the material filled in the gap space becomes solidified; and setting the motor into the casing with the jig removed therefrom.

The jig may have a sealing feature configured to maintain the enclosed state of the gap space to be created between the casing and the outer periphery of the jig.

With the above configuration, the present invention provides for an index device of a machine tool and a method of manufacturing the index device of a machine tool that are capable of efficiently transferring heat to be generated during operation of a motor to the casing for housing the motor of the index device, hence to achieve suppression of rise in temperature of the motor at lower cost.

BRIEF DESCRIPTION OF THE DRAWINGS

The above and other objects and features of the present invention will become apparent from the description of embodiments to be described below with reference to the accompanying drawings, wherein.

DETAILED DESCRIPTION OF THE PREFERRED EMBODIMENTS

The present invention includes a structure that is capable of efficiently transferring heat to be generated from a motor in operation to a motor housing casing by filling gap between the outer periphery of the motor and the motor housing casing with a material with higher thermal conductivity than the air, in order to achieve suppression of temperature rise of the motor at lower cost.

First Embodiment

Figure 1:
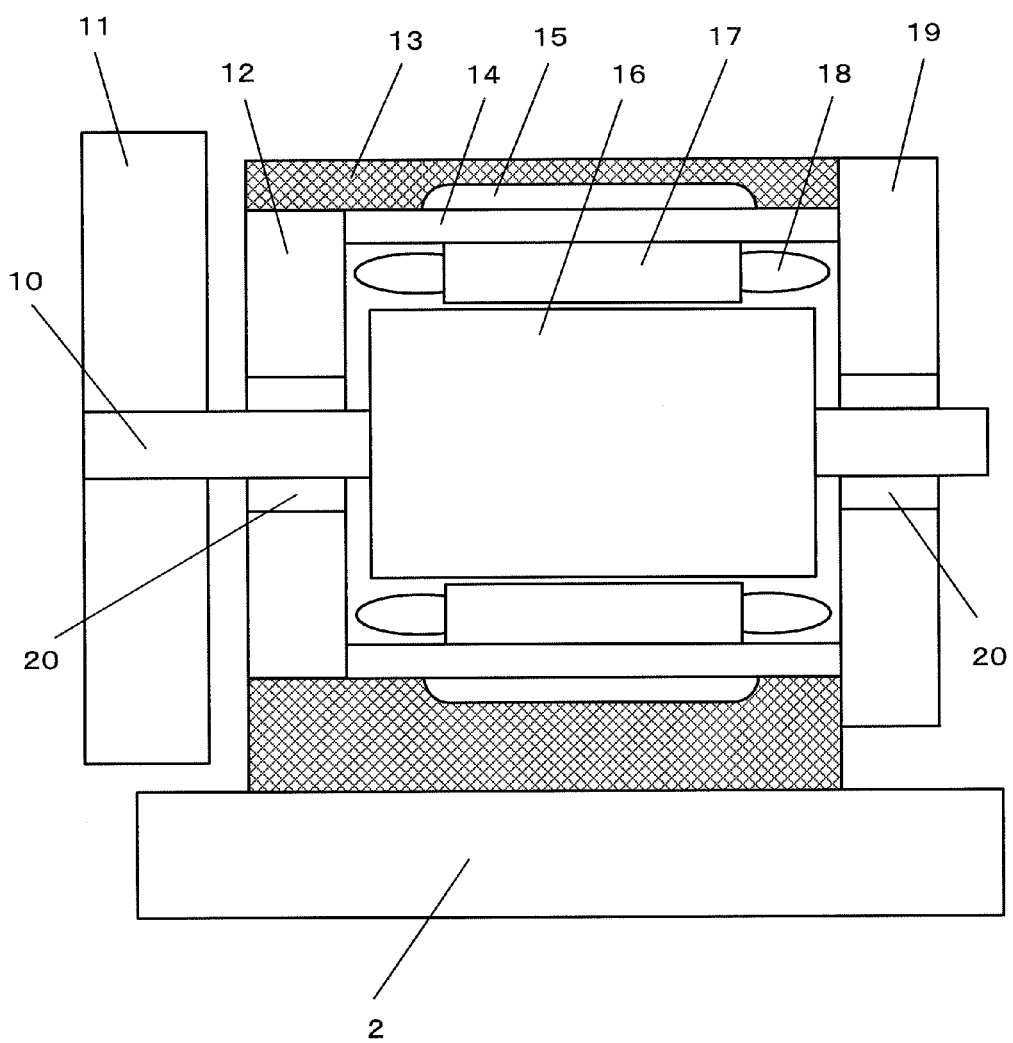
FIG. 1 is a schematic explanatory diagram of a direct drive index device.
Figure 2:
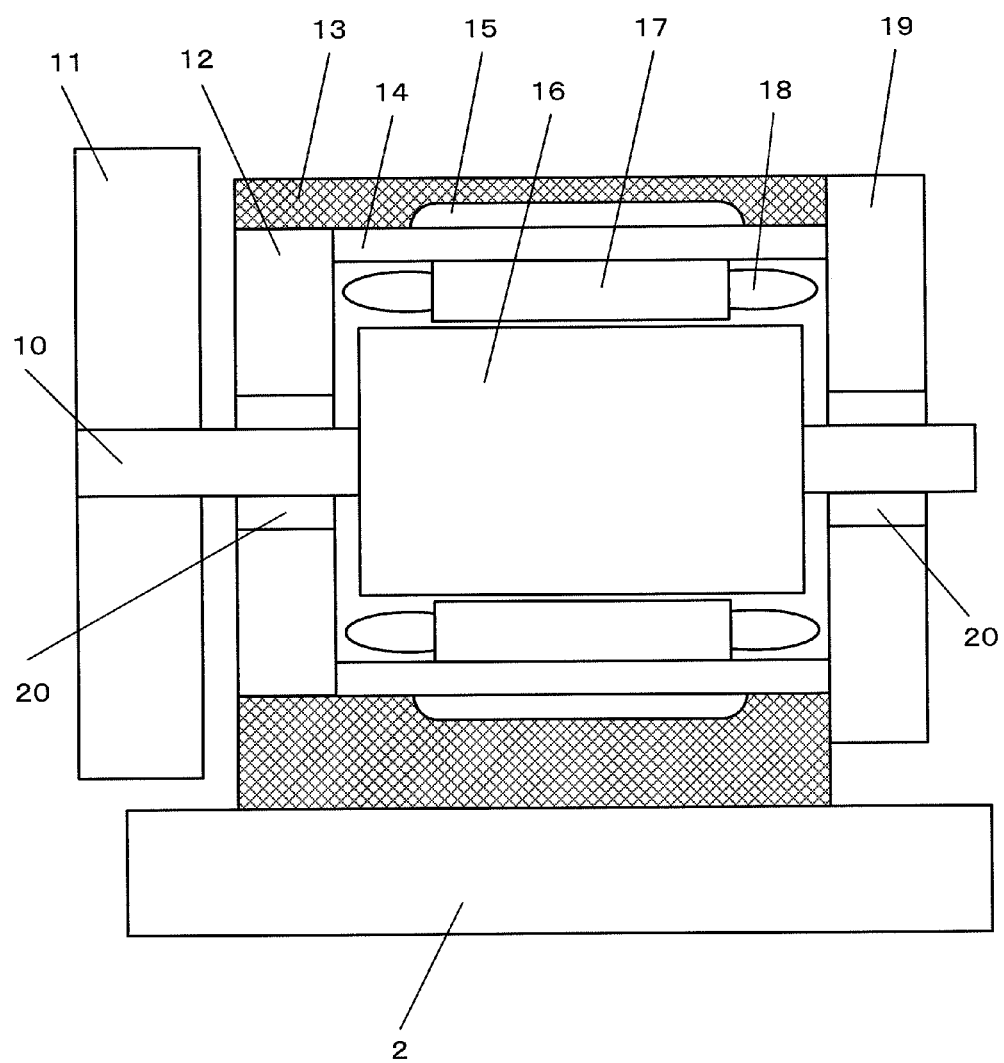
FIG. 2 is an explanatory diagram of an example in which a highly thermally conductive material is filled in gap between the outer periphery of a motor for driving an index device and the inner periphery of the motor housing casing.

FIG. 2 is an explanatory diagram of an example in which a highly thermally conductive material is filled in gap between the outer periphery of a motor and the inner periphery of a motor housing casing. The structure of the index device having the motor built therein has been described in the background section, and thus the description thereof is not redundantly given.

Description is given here of a configuration for an index device having a motor M built therein of a machine tool, to suppress temperature rise of the motor M. A material with higher thermal conductivity than the air is filled in gap space 15 created between a motor housing casing 13 and a case 14 of the motor. The gap space 15 is produced by the shape of the motor housing casing 13.

Materials with higher thermal conductivity than the air include, for example, gas such as nitrogen, liquid such as water, resin, solids such as metal, ceramic, glass, and carbon, and powder or liquid containing these solids, as well as a gel member. As described below, the configuration according to the present invention allows for effective suppression of rise in temperature of the motor, hence increasing continuous rated power of the motor.

Second Embodiment

Figure 3:
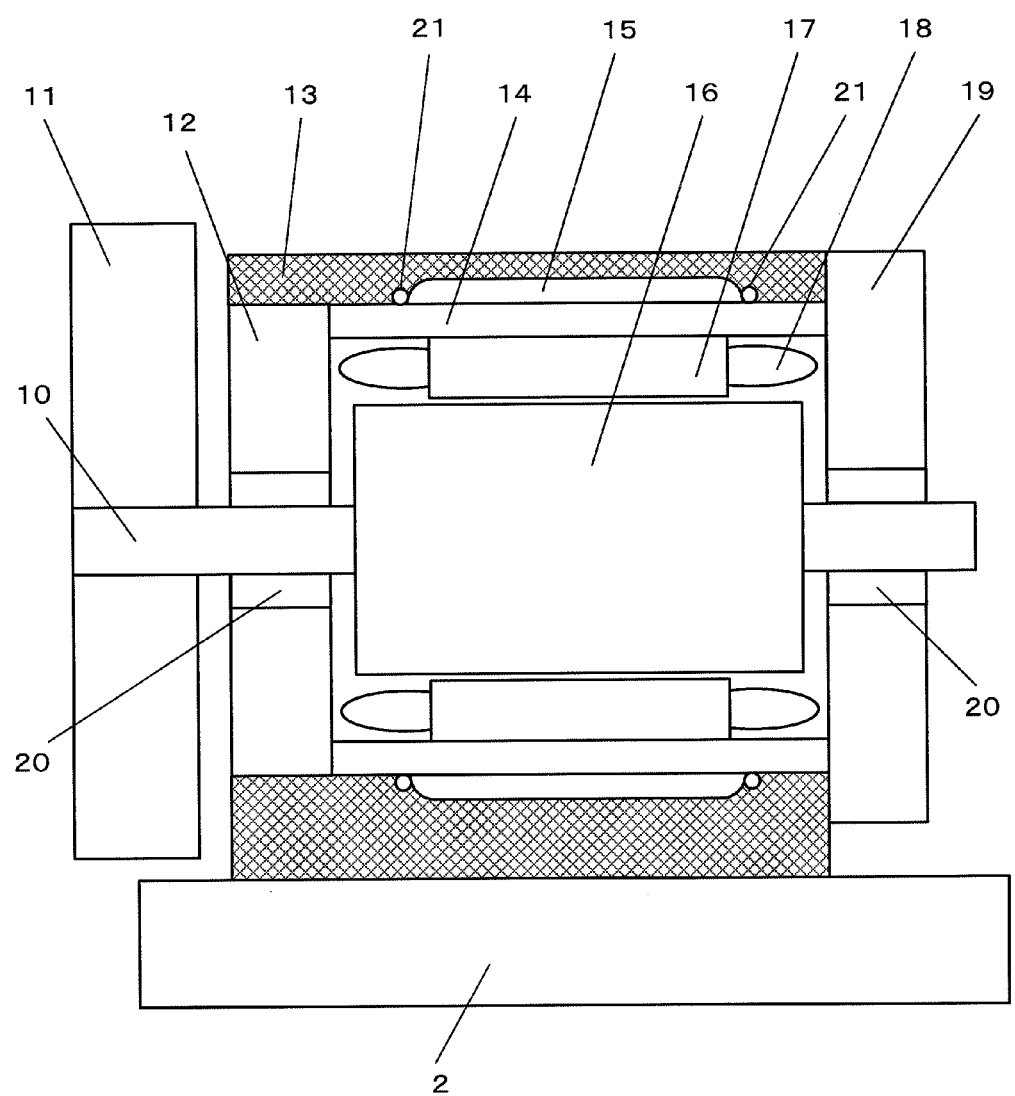
FIG. 3 is an explanatory diagram of an example in which a sealing member is used to prevent a material filled in gap space that is created between a casing for housing a motor and a case of the motor from leaking from the gap space.

FIG. 3 is an explanatory diagram of an example in which a sealing member is used to prevent a material filled in gap space that is created between a motor housing casing and a case of the motor from leaking from the gap space.

Providing gap for assembling a motor facilitates work of attaching a motor M to a motor housing casing 13. A sealing feature 21 such as an O ring or an oil seal is provided to prevent a material filled in gap space 15 that is created between the motor housing casing 13 and a case 14 of the motor, which material is higher in thermal conductivity than the air, from leaking from the gap space 15.

According to this embodiment, leakage of the highly thermally conductive material filled is preventable in filling gap between the outer periphery of the case 14 of the motor and the casing 13 for housing the motor of the index device with the material that is higher in thermal conductivity than the air. Further, in the case where the filled material is a highly thermally conductive material that does not harden upon being filled, the filled material will not leak over an extended period of time.

Third Embodiment

Figure 4:
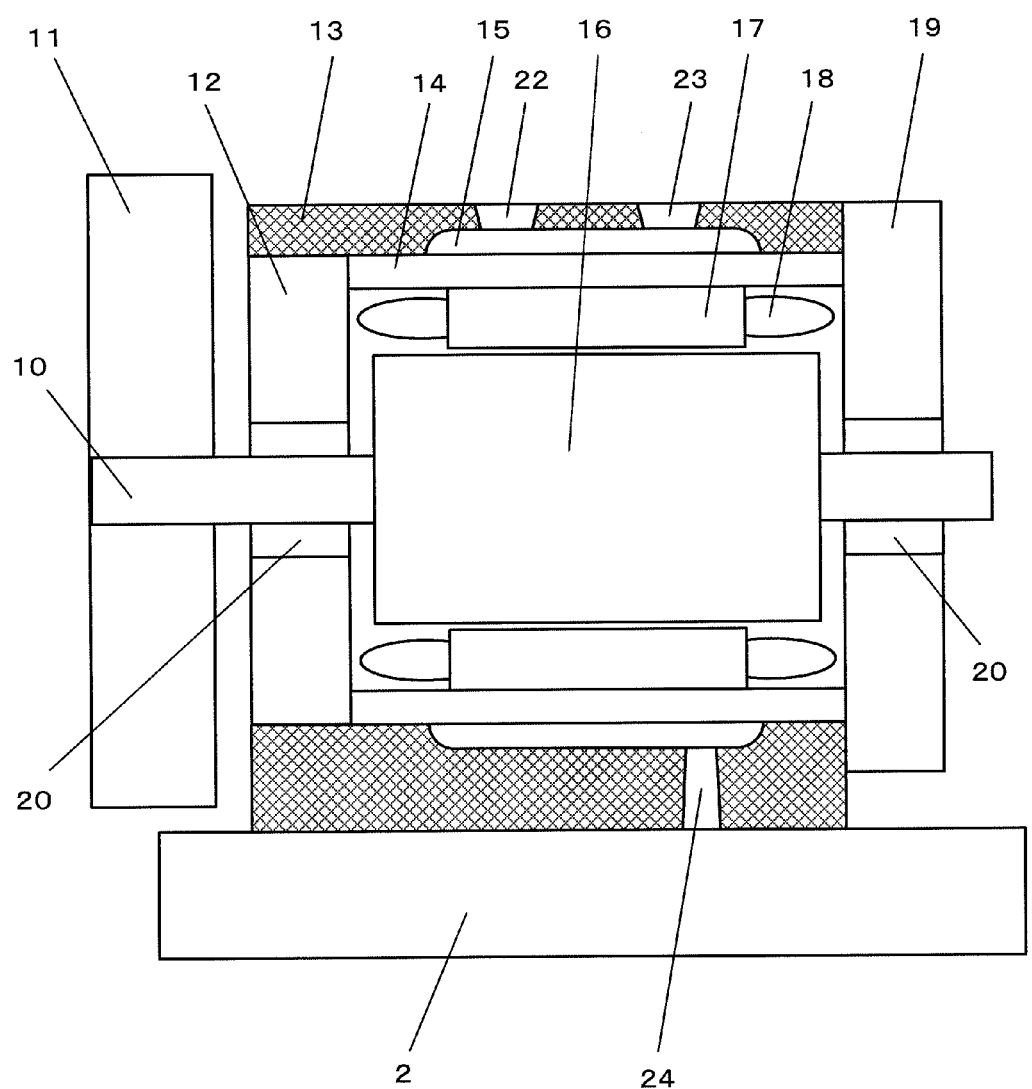
FIG. 4 is an explanatory diagram of an example in which an opening for introducing and sealing a filling material is provided in a motor housing casing.
Figure 5:
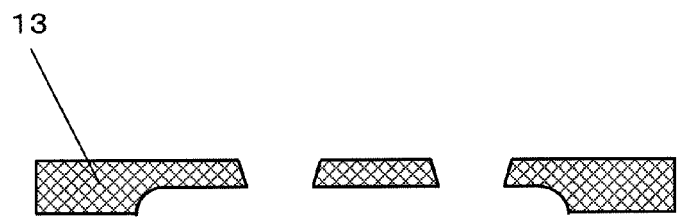
FIG. 5 is a cross-sectional view of a casing configured to house a motor for driving an index device.
Figure 5:
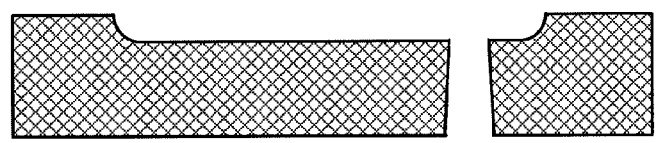

FIG. 4 is an explanatory diagram of an example in which an opening for introducing and sealing a filling material is provided in a motor housing casing.

An opening is provided in such a way as to pass through a motor housing casing 13 from the outer peripheral surface thereof to gap space 15 created between the casing 13 and a case 14 of the motor, so as to conduct introduction and sealing of a material with higher thermal conductivity than the air. The opening for introducing and sealing in the gap space 15 the material with higher thermal activity than the air permits the material to be filled in the gap space 15. The function of the opening is enhanced by providing a plurality of such openings in the motor housing casing 13.

A pair of openings 22 and 23 is provided at an upper portion of the motor housing casing 13. A first opening 22 is used for pouring the highly thermally conductive material, and a second opening 23 is used for removing the air therefrom. Upon introduction of the highly thermally conductive material in the gap space 15 that is created between the motor housing casing 13 and the case 14 of the motor, these openings 22 and 23 are closed with plugs such as screws (not shown).

The thermally conductive material that has been sealed in the gap space 15 once is dischargeable by providing in a bottom portion of the motor housing casing 13 an opening 24 for use as a drain for discharging the highly thermally conductive material. Note that the opening 24 is closed with a plug such as a screw (not shown) for filling the highly thermally conductive material into the gap space 15 through the opening 22 or 23.

Fourth Embodiment

A method of manufacturing an index device of a machine tool is described with reference to FIGS. 5 to 9.

In manufacturing one embodiment of the index device of a machine tool according to the present invention, a casing 13 for housing a motor M for driving the index device of the machine tool is applied with a jig 25 with its outer periphery being of the same diameter as the outer diameter of a case 14 of the motor M before setting the motor M into the casing 13.

Description is given below of the method of manufacturing the index device of a machine tool according to the present invention step by step.

Step 1

Before setting the motor M for driving the index device of the machine tool into the casing 13 for housing the motor M, the jig 25 (see FIG. 6), which has the outer periphery that is the same in diameter as the outer diameter of the casing 13 for housing the motor M (see FIG. 5), is inserted into the casing 13.

Step 2

Figure 7:
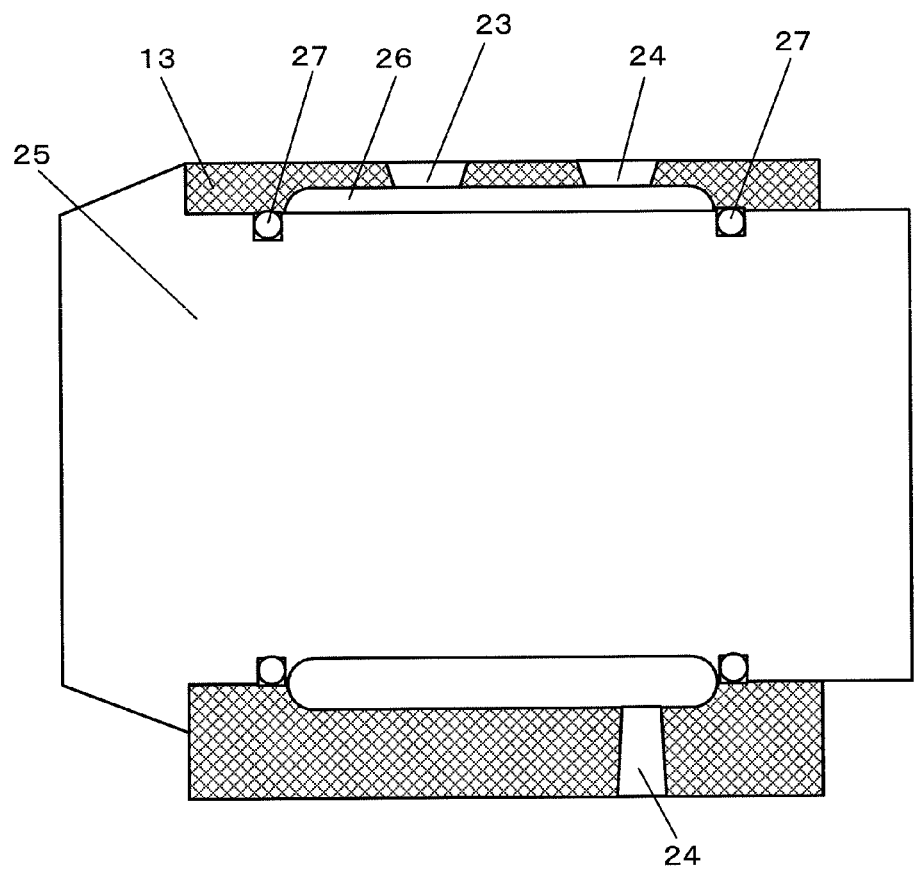
FIG. 7 is an explanatory diagram of preliminary filling of a highly thermally conductive material in a motor housing casing by using the jig with the sealing feature.
Figure 8:
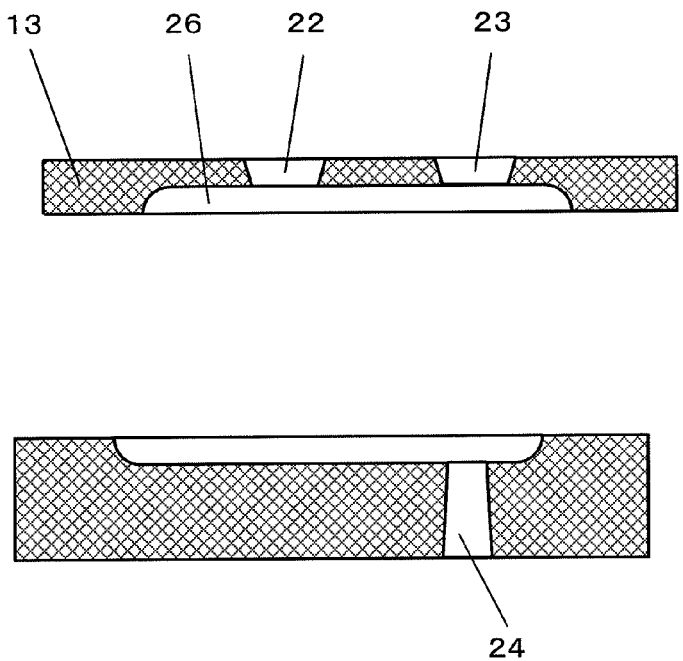
FIG. 8 is an explanatory diagram of a state in which the material has been completely filled and the jig with the sealing feature is detached from the motor housing casing.

A material with higher thermal conductivity than the air is filled into gap space 26 created between the casing 13 for housing the motor M and the outer periphery of the jig 25 by using an opening 22 (or 23) provided in the casing 13 for housing the motor M (see FIG. 7). An opening 24 is closed with a plug such as a screw. Note that the plug is not shown in FIG. 7.

Step 3

After filling a material with higher thermal conductivity than the air into the gap space 26, the openings 22 and 23 are closed with plugs such as screw as needed. Upon solidification of the filled material, the jig 25 is removed from the casing 13 for housing the motor M (see FIG. 8). Note that the plugs are not shown in FIG. 8.

Step 4

Figure 9:
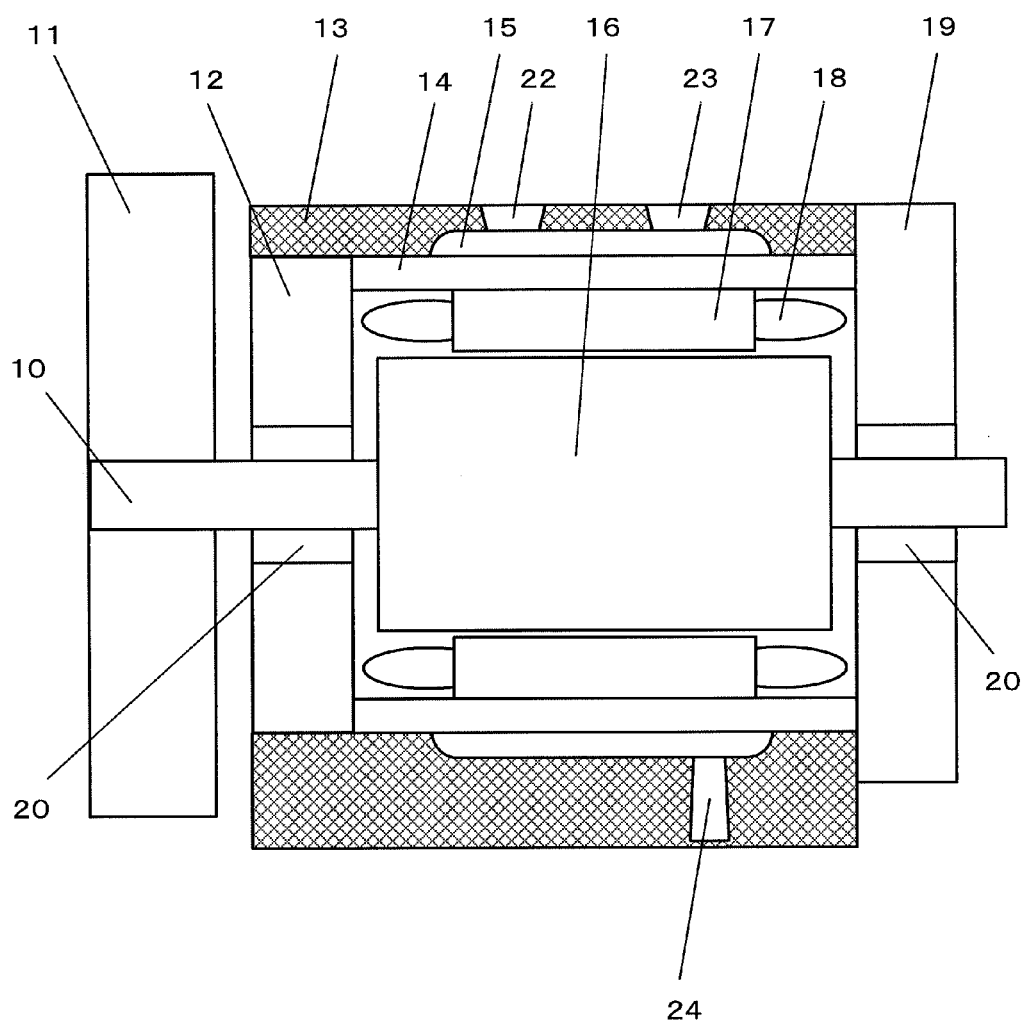
FIG. 9 is an explanatory diagram of a state in which a motor for driving the index device is set in the casing with the material completely filled therein.

The motor M is set in the casing 13 for housing the motor M (see FIG. 9).

This manufacturing method allows the material with higher thermal conductivity than the air to be filled in gap space 15 by using the jig 25 in place of the motor M. Thus, the motor M is settable at any timing in the steps of manufacturing the index device. As a result, process management of manufacture is facilitated.

Fifth Embodiment

Figure 6:
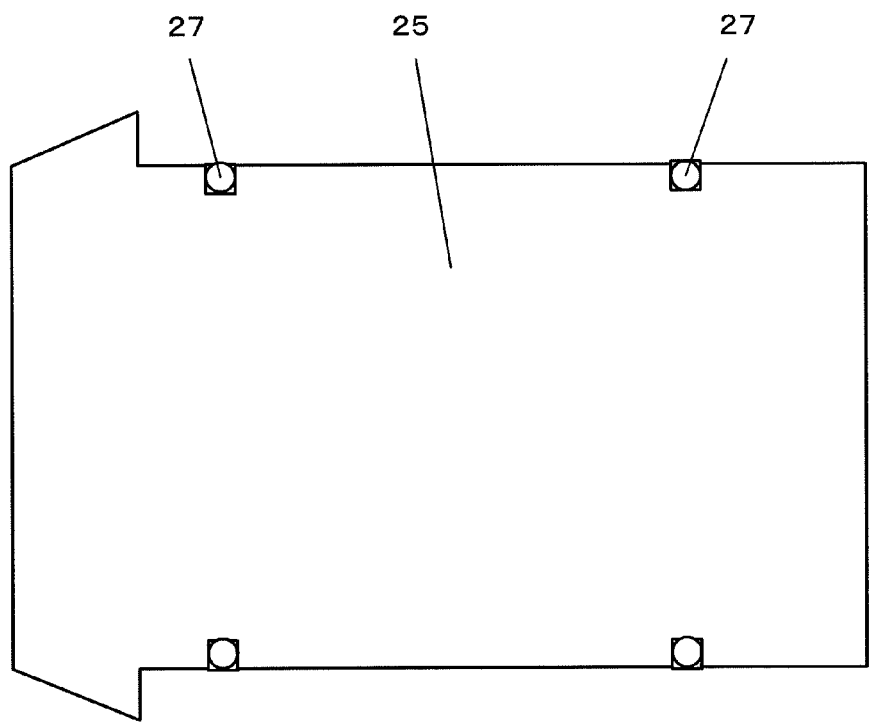
FIG. 6 is a cross-sectional view of a jig with a sealing feature.

The jig 25 depicted in FIG. 6 includes a sealing feature 27 for use with an O ring or an oil seal for maintaining the enclosed state of the gap space 26 to be created between the casing 13 for housing the motor M and the outer periphery of the jig 25. The sealing feature 27 is such that a groove is provided on the outer peripheral surface of the jig 25 to allow an O ring or an oil seal to be mounted thereon, and that the O ring or the oil seal is fitted into the groove.

The jig 25 is inserted into the casing 13 for housing the motor M, and a material with higher thermal conductivity than the air is filled into the gaps space 26 that is created between the outer periphery of the jig 25 and the casing 13. In the case where a permanently fluid material is used as the material with higher thermal conductivity than the air for filling the gap space 26, or alternatively, the material is at a stage where the fluidity is high before solidification, any material with higher thermal conductivity than the air is prevented from entering the gap between the inner peripheral surface of the casing 13 for housing the motor M and the inner peripheral surface of the jig 25.

In manufacturing an index device of a machine tool, using the jig 25 with the sealing feature 27 dispenses with provision of the sealing feature 21 on the side of the motor housing casing 13, allowing for simplification of the shape of the motor housing casing 13.

The invention claimed is:

1. A method of manufacturing an index device of a machine tool, the method comprising:
   providing a jig having an outer periphery of the same outer diameter as an outer diameter of a motor for driving the index device;
   prior to setting the motor into a casing configured to house the motor, inserting the jig into the casing;
   filling, through an opening provided in the casing, a material with higher thermal conductivity than the air into a gap space created between the casing and the outer periphery of the jig;
   removing the jig from the casing when the material filled in the gap space becomes solidified; and
   setting the motor into the casing after said removing the jig from the casing.

2. The method according to claim 1, wherein the jig has a sealing surface which maintains an enclosed state of the gap space between the casing and the outer periphery of the jig when the jig in inserted into the casing.

3. The method according to claim 1, wherein the material is in direct contact with the casing and the outer periphery of the jig when the material filled in the gap space becomes solidified.

* * * * *